(12) United States Patent
Adin et al.

(10) Patent No.: US 6,663,766 B1
(45) Date of Patent: Dec. 16, 2003

(54) ELECTROFLOCCULATION PROCESS AND APPARATUS

(75) Inventors: Avner Adin, Herzeliya (IL); Nicholai Vescan, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/979,743

(22) PCT Filed: May 22, 2000

(86) PCT No.: PCT/IL00/00289

§ 371 (c)(1),
(2), (4) Date: Apr. 18, 2002

(87) PCT Pub. No.: WO00/73215

PCT Pub. Date: Dec. 7, 2000

(30) Foreign Application Priority Data

May 27, 1999 (IL) .................................................. 130177

(51) Int. Cl.[7] .............................................. C02F 1/461
(52) U.S. Cl. ................ 205/742; 205/751; 205/757; 205/761; 204/554; 204/269; 204/276; 204/278.5
(58) Field of Search ............................... 205/742, 751, 205/757, 761; 204/554, 269, 276, 278.5

(56) References Cited

U.S. PATENT DOCUMENTS

| 5,531,865 A | * | 7/1996 | Cole | 205/751 |
| 5,814,227 A | * | 9/1998 | Pavlis | 210/696 |
| 5,928,493 A | * | 7/1999 | Morkovsky et al. | 205/757 |
| 6,179,991 B1 | * | 1/2001 | Norris et al. | 205/742 |

* cited by examiner

Primary Examiner—Arun S. Phasge
(74) Attorney, Agent, or Firm—Ladas & Parry

(57) ABSTRACT

The invention provides an electroflocculation process for producing potable water from impure water, comprising forming trivalent ions in situ by electrolysis of metallic electrodes (16) selected from the group consisting of metallic aluminum electrodes and metallic iron electrodes, wherein water to be treated is caused to ascend sequentially through apertures (22) provided in a stack of parallel metallic plates (16) serving as said electrodes, each plate being charged with a polarity opposite to plates adjacent thereto, apertures of adjacent plates being vertically misaligned, whereby turbulent flow and mixing is created by the sequential passage of said water to be treated from the aperture of the lowest of said plates to the apertures of the plates thereabove to exit from the highest of said plates.

23 Claims, 3 Drawing Sheets

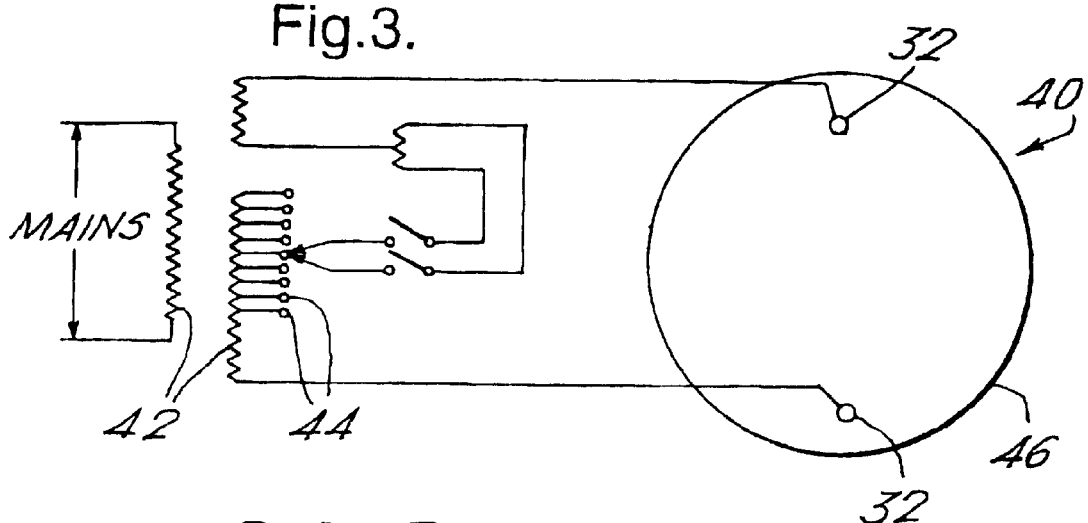
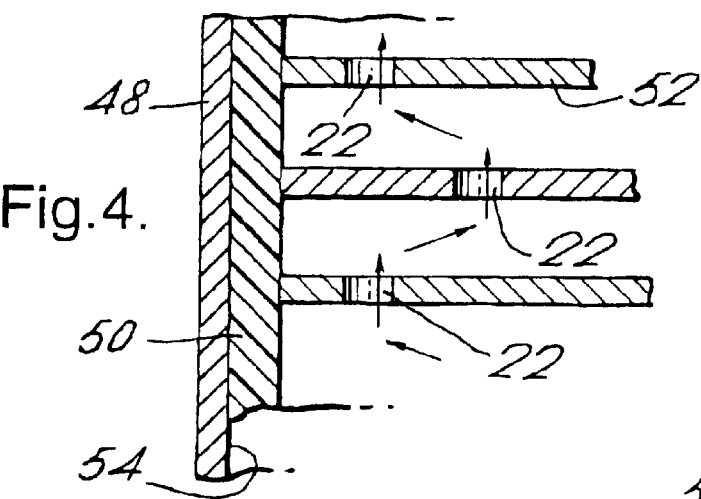
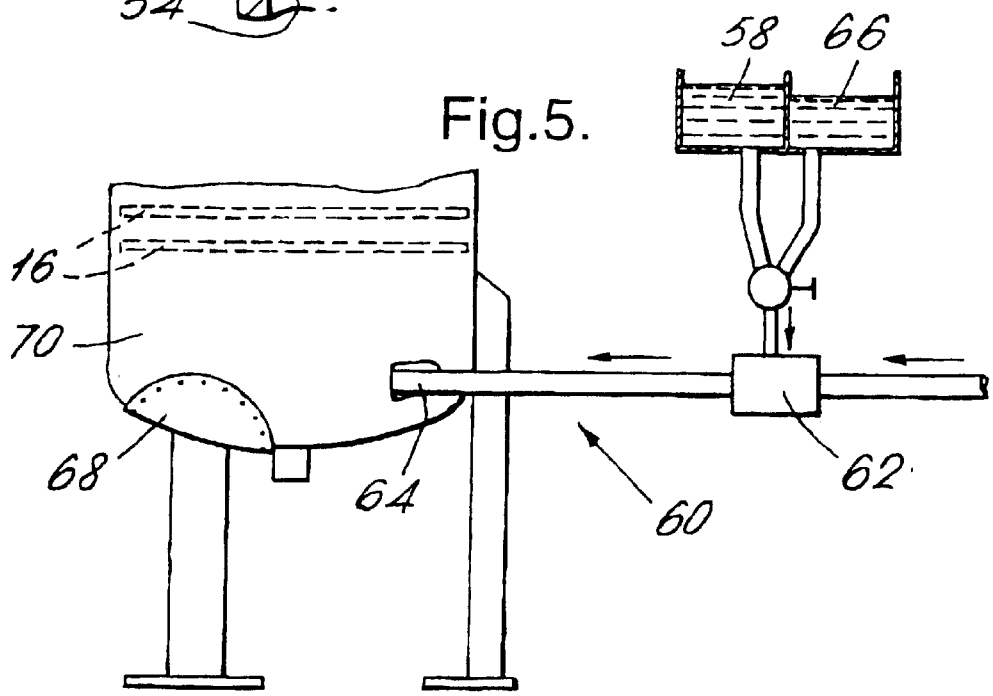

ELECTROFLOCCULATION PROCESS AND APPARATUS

The present invention relates to an electro-flocculation process and apparatus for water treatment and especially for the production of drinking water.

More particularly, the present invention relates to a flocculation process and apparatus using trivalent ions such as those of aluminum and iron, accompanied by in-situ disinfection, without the need for flotation and sedimentation steps as described in the prior art.

Surface water intended for drinking water supply at present are treated for particle removal until extremely low turbity is reached.

Tertiary or advanced wastewater treatment is a requirement in some countries prior to disposal of water, and is one of the most important demands for wastewater reuse. Common tertiary or advanced wastewater treatment schemes include chemical coagulation (flocculation) of secondary clarifier effluent followed by sedimentation, and/or filtration and disinfection. The physical processes associated with classical coagulation are rapid mixing (when chemical coagulants are quickly and uniformly dispersed in the water and particles are destabilized), and then slow mixing or flocculation (when particles slowly aggregate and form settleable or filterable flocs). Chemical flocculation processes are known to aggregate wastewater constituents having a size ranging from 0.1 $\mu m$ to about 10 $\mu m$.

Aluminum or iron salts may be added at various stages in a potable water or wastewater treatment plant to enhance solids removal. The metal salt (coagulant or flocculant) destabilizes colloidal solids that would otherwise remain in suspension and thus can be used to improve effluent quality. In spite of the increased use of chemical coagulants, coagulation theory still fails in providing the use of the process in an optimal manner, particularly under transient conditions. This could lead to diminished effluent quality, increased chemical costs by routine overdosing, or both. An improved coagulation process would alleviate its adverse effects on sludge dewaterability and disposal.

Coagulation has been the subject of much research, some of which have proposed coagulation in the context of water treatment. However, wastewater treatment differs from potable water treatment in several ways: particulate matter is present in substantially greater concentrations in wastewater; the average particle size is also greater. These factors are likely to affect both coagulant demand and flocculation behavior. The particulates to be removed include a much greater proportion of organic material than in the case of water treatment for drinking purposes. The more hydrophilic surfaces of these particles may react differently to a coagulant.

The mechanisms of coagulation by $Al^{+3}$ salts may involve some chemical factors including the hydrolyzing and polymerizing tendencies of the $Al^{+3}$ ion, the adsorptivity of such aluminum hydroxide species; the solubility of such species; the nature and extent of aluminum hydroxide precipitation, including interaction with other colloidal surfaces and effects of other solutes of surface properties on the metal hydroxide species. In light of this apparent complexity, it is not surprising that a number of different models have been proposed to explain the way aluminum salts can destabilize colloids.

The earliest explanation on particle destabilization considered only double-layer compression by $Al^{+3}$ ions as such. Other explanations suggested that the hydrolysis products of aluminum play a more important role in particle destabilization. More current explanations of coagulation with alum or iron flocculants hypothesize the existence of two distinct mechanisms, which are charge neutralization and adsorption of positively charged, polynuclear aluminum species to the particles; or the physical enmeshment of particulates in an aluminum hydroxide precipitate.

Electrochemical processes in water treatment which are gaining ground are electrofloatation and disinfection. The main advantage of the electrochemical process of disinfection is the production of disinfective chemicals in situ in the treatment device.

Floatation is a gravity separation process in which air bubbles are attached to individual solid particles, thereby reducing their density so that they float to the surface of the liquid. In the electrofloatation process gas bubbles are generated by electrolysis of the liquid. A 5–20V direct current is used at a current density of approx. 100 amp/$m^2$ of electrode The particular attraction of floatation, as compared to sedimentation, is that particles' rising rate is generally much higher than their settling rate, so that the size of the unit for a given duty is approximately one third of that of a clarifier.

In WO 95/15295, EP 668 244, GB 2,045,803 and DE 3,641,365, as well as in WO 97/35808, there are described electroflocculation processes involving the release of aluminum ions through an electrolytic cell. The first four documents refer to the electroflocculation-flotation process with regard to wastewater and teach the formation of trivalent ions in situ by electrolysis of a metallic aluminium or iron electrode, while the latter document, although referring to the use of said process for producing drinking water, does not teach the apparatus or method which would enable said process to be carried out With this state of the art in mind, it is an object of the present invention to combine known electrochemical processes for water and wastewater treatment with the introduction of trivalent ions directly into the solute by electrolysis and the use of specially designed apparatus, as defined and described hereinafter.

More particularly, the present invention provides an electroflocculation process for water and wastewater treatment comprising providing a stack of electrically-conducting perforated spaced-apart plates serving as metallic electrodes, said electrodes being selected from the group consisting of metallic aluminum electrodes and metallic iron electrodes, and said plates being suspended in a vessel with their peripheral edges in proximity to a wall of said vessel, each plate being electrically insulated from adjacent plates and having apertures misaligned relative to apertures of adjacent plates; and supplying a voltage to said electrodes in the range of between 2 to 60 volts to form trivalent ions in situ by electrolysis of said metallic electrodes, which trivalent ions function as coagulation agents, wherein water to be treated is caused to ascend sequentially through apertures provided in said stack of parallel metallic plates serving as said electrodes, each plate being charged with a polarity opposite to plates adjacent thereto, apertures of adjacent plates being vertically misaligned, whereby turbulent flow and mixing is created by the sequential passage of said water to be treated from the apertures of the lowest of said plates to the apertures of the plates thereabove to exit from the highest of said plates.

In preferred embodiments of the present invention the distance between said plates is between 0.5 and 1.5 cm. The present invention also provides an apparatus for water and wastewater treatment by the electroflocculation process, comprising a) a processing vessel having a lower inlet for impure water, and an upper outlet for purified water,
b) a stack of electrically-conducting perforated spaced-apart plates serving as metallic electrodes, said electrodes being selected from the group consisting of metallic aluminum electrodes and metallic iron electrodes, and said plates being suspended in said vessel with their peripheral edges in proximity to a wall of said vessel, each plate being electrically insulated from adjacent plates and having apertures misaligned relative to apertures of adjacent plates; and
c) a first and a second electrically conducting member, said first member being electrically connected to the upper plate of said stack and to alternate lower plates and insulated from other plates, said second member being electrically connected to plates electrically unconnected to said first member and insulated from plates connected to said first member, said conducting members being provided with terminals outside said vessel for connection thereto of an electric power supply, supplying voltage in the range of between 2 and 60 volts for forming trivalent ions in situ by electrolysis of said metallic electrodes which trivalent ions function as coagulating agents within the vessel.

In U.S. Pat. No. 3,841,483 (D1) there is described a water purification system including a flow-through water purification apparatus for separating colloidal particles suspended therein.

While said patent describes the use of a plurality of mutually spaced oppositely charged plates arranged in a manner superficially similar to that of the present invention, said patent teaches and describes a process based on an entirely different principle and mechanism in that said patent describes the application of a voltage of up to around 200 volts to induce positively charged ionization thus causing electrophoretic action leading to coagulation of the colloid particles.

Similarly, while said patent mentions the possible use of metals such as iron and aluminum said metals are mentioned in the context of the possible use of known metals such as iron, aluminum, copper and bismuth and even carbon, which is not a metal, or any combination of various alloys and thus it is clear that the mere mention of iron and aluminum in said patent is not intended to suggest or teach the intentional forming of trivalent ions in situ by electrolysis of said metallic electrodes which trivalent ions function as coagulating agents within the process.

In LU 88 244 (D2) there is described a process and apparatus for water purification which publication describes the use of a plurality of mutually spaced oppositely charged plates. However, as can be seen from the figures of said patent the plates are arranged vertically rather than horizontally and results in stagnant volumes and sedimentation or floatation because of the positioning of the vertical plates. Thus said patent does not teach or suggest the process or apparatus of the present invention wherein turbulent flow and mixing is created by the sequential passage of water to be treated from the apertures of the lowest of said plates to the apertures of the plates thereabove to exit from the highest of said plates The classical coagulation agent $Al^{+3}$ ions is usually obtained by dissociation of dissolved alum salt $[Al_2(SO_4)_3]$ containing 13 to 18 molecules of bound water. The molecular weight of the alum is 666.7 and the aluminum (m.m. 54) from this represents only 8% as the active component of the flocculation process. The removal efficiency is a function of coagulant dosage, and the pH level, as well as the mixing (dispersion) condition.

According to the present invention and in contradistinction to the classical approach to coagulation and flocculation, trivalent ions are introduced directly in situ.

Coagulant chemicals are purchased either in dry or liquid form. Dry chemicals require fairly elaborate dissolving and feeding equipment. For effective chemical usage, mixing with the process water stream must be rapid and complete. A high speed mixer or equivalent static mixer is required.

For each milligram/liter of alum added, the sulfate content of the water increases by 0.5 mg/l. This may be detrimental if the raw water sulfate content is high, or if the plant uses ion exchange for nitrate removal.

The present invention provides for the direct introduction in the raw water stream of only the $Al^{+++}$ of $Fe^{+++}$ ions in an electrochemical process. The mixing conditions according to the present invention are easier than in the classical methods. In addition, because the raw water $OH^-$ contents will increase, an effective oxidizing-disinfecting stage is created in the same unique treatment-step.

Besides the savings on flocculant cost, the concentration of aluminum in the effluent is minimized, thus reducing potential hazardous effects resulting from high aluminum concentrations in water.

The process of the present invention is simple in the aspects of setting up, operation and maintenance. Consequently it is applicable also for small communities which are unable to employ skilled specialists for running a costly and complex process.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Comparative Example 1

A series of laboratory-scale experiments were performed. The following results were obtained (as are shown in Table 1 hereinafter).

Sample of raw wastewater having initial turbidity of 400 NTU and TSS of 660 mg/l was conventionally treated with a dosage of 40 mg/l alum. Reductions to 65 NTU and TSS to 135 mg/l were obtained.

By electroflocculation of a second sample of the same raw wastewater according to the present invention, using a metallic electrode for producing trivalent ions, 2.5 NTU and TSS of 8.8 mg/l were obtained.

Example 2

Another series of electroflocculation experiments was carried out according to the present invention and the results are presented in Table 1 hereinafter.

TABLE 1

110 cc/min, pH 8, 5 ppm Humic acid +
2 Hours of Sedimentation

| Voltage (V) | Current (mA) | Turbidity NTU | Total Suspended Solids (TSS) | Total Particle Count (TPC)I | Sludge Volume (ml) | Electrical Conductivity (mS) |
|---|---|---|---|---|---|---|
| Water at Entry | | 5.7 | 6.6 | 5490 | | 1.08 |
| 6 | 175 | 4.3 | 3.8 | 3180 | 25 | 1.08 |
| 12 | 354 | 2.9 | 2.1 | 2005 | 48 | 1.00 |
| 24 | 878 | 1.0 | 0.9 | 1670 | 70 | 0.93 |

As can be seen, with increase in voltage and current, turbidity and total particle count, as well as total suspended solids is reduced when using the apparatus of the present invention.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a diagrammatic view of an embodiment of the apparatus having a variable voltage power supply;

FIG. 4 is a sectional detail view of an embodiment of the apparatus provided with an elastomeric sealing member disposed between the peripheral edges of the electrode plates and the wall inner surface; and FIG. 5 is a diagrammatic view of an embodiment of the apparatus arranged for the controlled addition of fluids containing $Al^{+++}$ and $Fe^{+++}$ ions.

Figure 1:
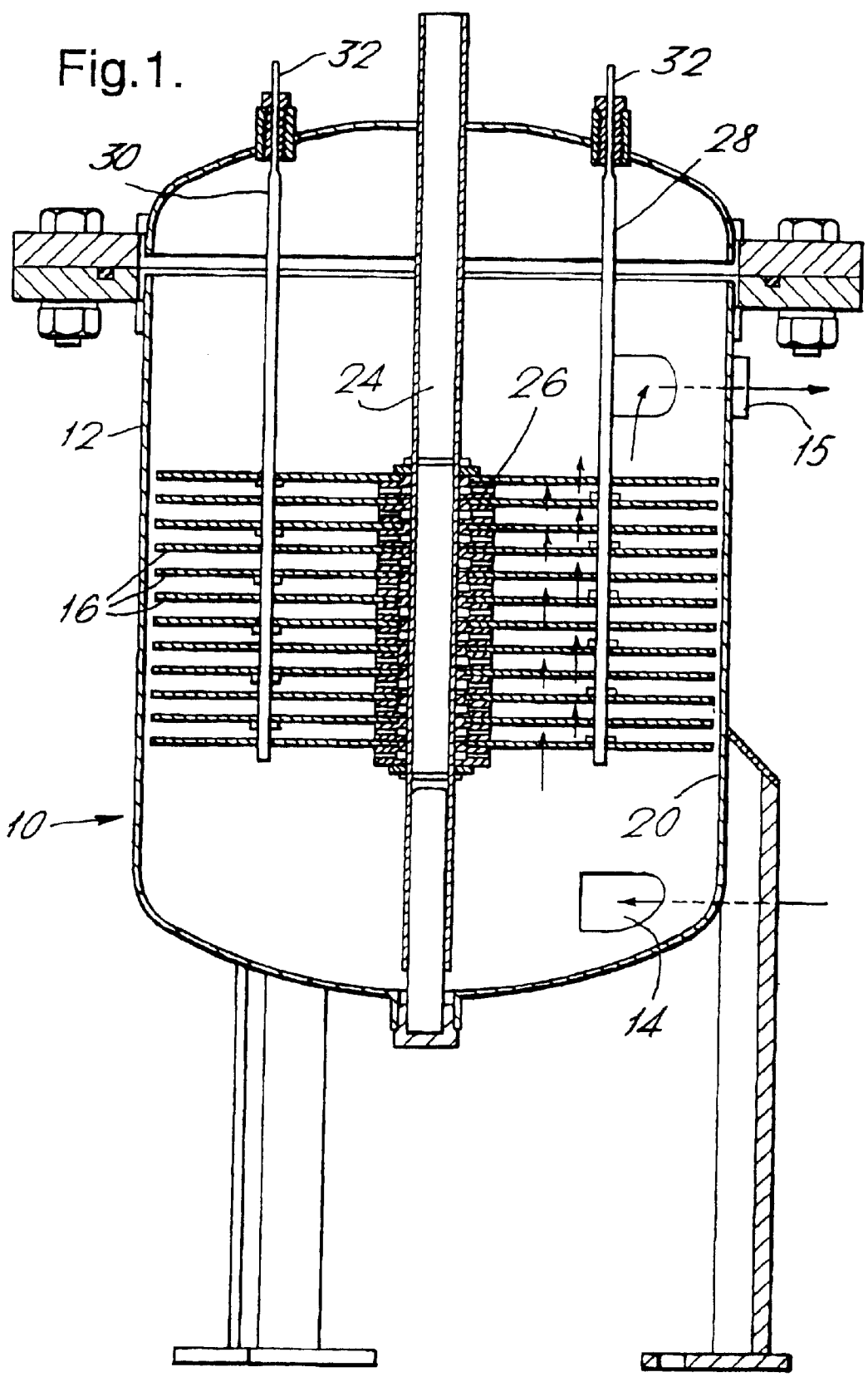
FIG. 1 is a perspective view of a preferred embodiment of the apparatus according to the invention.

There is seen in FIG. 1 an apparatus 10 for carrying out a central step in producing potable water from impure water by the electro-flocculation process.

Solids are removed by settling or filtering beforehand after the above step.

A processing vessel 12 has a lower inlet 14 for impure water, and an upper outlet 15 for purified water and flocs. The vessel 12 is made of metal. It should be noted that vessel 12 can be made of polyester reinforced with fiber glass.

Figure 1B:
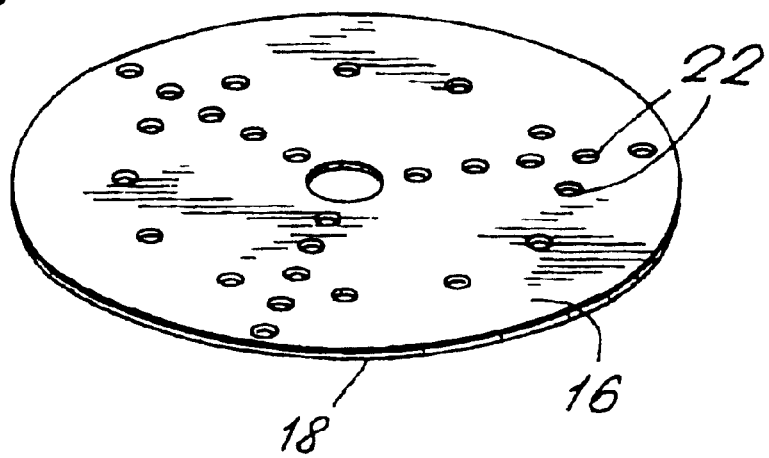
FIG. 1b is a perspective view of one of the electrode plates used in the same embodiment.

A stack of electrically-conducting perforated spaced-apart electrode plates 16 serve as metallic electrodes. FIG. 1b shows one of the electrode plates.

Preferably the distance between plates 16 is between 0.5 and 1.5 cm. The plates 16 are either of metallic aluminum or of metallic iron.

Advantageously when aluminium plates are used, all the plates 16 are made of metallic aluminum. Similarly, where iron plates are used, all plates 16 are made of metallic iron.

The plates 16 are suspended in the vessel 12 with their peripheral edges 18 in proximity to a wall 20 of the vessel 12. Each plate 16 is electrically insulated from adjacent plates 16, and from the vessel 12.

Plate apertures 22 are misaligned relative to apertures of adjacent upper and lower plates, as shown in FIG. 4, causing turbulence as water rises through the unaligned apertures.

In the present embodiment plates 16 are supported from a central tube 24, and all plates are insulated therefrom by plastic washers 26, suitably made of PVC.

A first and a second electrically conducting member 28, 30 carry electric power to the electrode plates 16.

The first member 28 is electrically connected to the upper plate 16 of the stack and to alternate lower plates, while being insulated from other plates.

The second member 30 is electrically connected to the remaining plates, i.e. alternate plates electrically unconnected to the first member 28. The second member 30 is however insulated from all plates 16 connected to the first member 28. Thus when electric power is applied, an electromagnetic field exists between each pair of adjacent plates, and a current flows through the water between the plates 16.

A convenient way of effecting this arrangement is seen In the illustrated embodiment. The first and second members 28, 30 are made of a screwed metal rod. Plates which are to be electrically connected are gripped between a pair of metal nuts and the plates which are to be insulated are held by a PVC shouldered bush (these parts being too small to be clearly shown in the figure).

Both conducting members 28, 30 are provided with terminals 32 outside the vessel 12 for connection thereto of an electric power supply.

Given adequate electric power, the rate at which water can be processed depends on the degree of impurity of the incoming water and the size of the electrode plates 16. For example, if the plates have an area on one major face of about 900 cm² and water is processed for 1 minute, about 40 liters of water per minute are produced, enough for a small community of 80–100 families.

With reference to the rest of the figures, similar reference numerals have been used to identify similar parts.

Figure 2A:
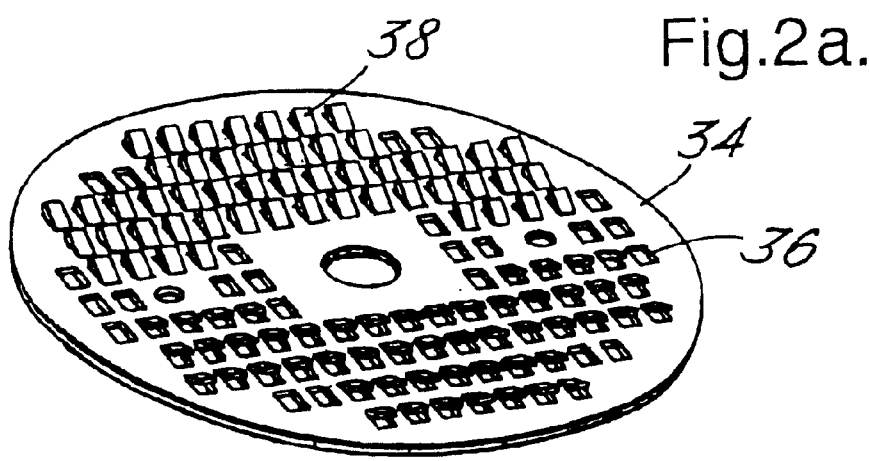
FIG. 2a is a perspective view of a second embodiment of an electrode plate.
Figure 2B:
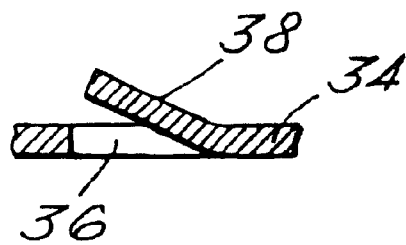
FIG. 2b is a sectional detail view of the same plate.

Referring now to FIGS. 2a & 2b, there is seen an embodiment of an electrode plate 34 wherein perforations 36 therein are formed by U-shaped cuts in the plate. The material inside the U is bent to extend outside the plane of the plate surface to form a deflector flap 38, causing turbulence to water passing through the perforation 36 and improves the emission of trivalent ions due to the corona effect. Such perforations and flaps are easily mass-produced on a power press equipped with a suitable punch and die.

FIG. 3 illustrates apparatus 40, similar to apparatus 10, further comprising means for varying the supplied voltage. Advantageously the supplied voltage may be varied within the range of 2 to 60 volt. Variable voltage is obtained from a transformer 42 provided with the necessary taps 44, i.e. coil intermediate connection points. The electric diagram refers to a standard transformer having tap-changing in the middle of the winding. The selected voltage, as has been explained, will be approximately inversely proportional to the conductivity of the water in the processing vessel 46.

Seen in FIG. 4 is a detail of an apparatus similar to that seen in FIG. 1. The processing vessel 48, made of metal, for example steel, further comprises an electrically insulating elastomeric sealing member 50 disposed between the peripheral edges of the electrode plates 52 and the inner surface of wall 54 within vessel 48. The sealing member 50 prevents passage of water between the plate edges 56 and the wall 54, thus ensuring that all water is treated by passage through the plate perforations 22.

Referring now to FIG. 5, there is depicted an apparatus 60 further comprising a mixing pump 62 connected to the processing vessel inlet 64 for impure water. An example of a suitable pump is the injector pump described by Bron in U.S. Pat. No. 4,395,201.

The pump 62 enables the controlled addition of fluids containing $Al^{+++}$ 58 and $Fe^{+++}$ ions 66. The additional ions speed up water processing and reduce erosion of the electrode plates 16

The figure also shows an access opening 68 for the removal of accumulated sludge from the processing vessel 70.

The invention also provides a process, which can be executed by using the above-described apparatus or other similar apparatus.

The electro-flocculation process for producing potable water from impure water, comprises the following steps:

Before starting the process, gross solids should be removed by filtering or settling.

Step 1

Forming trivalent ions in situ by electrolysis of metallic electrodes selected from the group consisting of metallic aluminum electrodes and metallic iron electrodes.

Step 2

Causing water to be treated to ascend sequentially through apertures provided in a stack of parallel metallic plates serving as said electrodes, each plate being charged with a polarity opposite to plates adjacent thereto, apertures of adjacent plates being vertically misaligned, whereby turbulent flow and mixing is created by the sequential passage of said water to be treated from the apertures of the lowest of said plates to the apertures of the plates thereabove to exit from the highest of said plates.

Preferably all of said plates are of metallic aluminum. In a further embodiment, all of said plates are of metallic iron.

Suitably water is pumped at a rate so that it traverses said plate stack in 0.5 to 2 minutes.

An appropriate voltage is applied to cause a current density is 1.5 to 4 mA per square centimeter of electrode surface.

Advantageously the supplied voltage may be varied, a higher voltage being applied to water having a low conductivity and a lower voltage being applied to water having higher conductivity.

The use of AC current has advantages in saving the rectifier and in equaling out the erosion wear on the electrode plates, thus prolonging their life. Where DC current is used, the polarity is reversed at intervals, e.g. daily, for the same purpose.

While it is possible to operate the method using only the metallic ions obtained from the electrode plates, the process can be accelerated by the addition to incoming impure water of fluids containing $Al^{+++}$ and $Fe^{+++}$ ions.

The flocs entrained in the outgoing pure water are removed by filtering or settling using known methods which are not part of the present invention.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. An electroflocculation process for water and wastewater treatment comprising providing a stack of electrically-conducting perforated spaced-apart plates serving as metallic electrodes, each of said plates being provided with an array of a multiplicity of through-going apertures and said electrodes being selected from the group consisting of metallic aluminum electrodes and metallic iron electrodes, and said plates being suspended in a vessel with their peripheral edges in proximity to a wall of said vessel, each plate being electrically insulated from adjacent plates and having apertures misaligned relative to apertures of adjacent plates; and supplying a voltage to said electrodes in the range of between 2 to 60 volts to form trivalent ions in situ by electrolysis of said metallic electrodes, which trivalent ions function as coagulation agents, wherein water to be treated is caused to ascend sequentially through apertures provided in said stack of metallic plates serving as said electrodes, each plate being charged with a polarity opposite to plates adjacent thereto, apertures of adjacent plates being vertically misaligned, whereby turbulent flow and mixing is created by the sequential passage of said water to be treated, through the plates, from the apertures of the lowest of said plates to the apertures of the plates thereabove to exit from the highest of said plates.

2. A process according to claim 1, wherein all of said plates are of metallic aluminum.

3. A process according to claim 1, wherein all of said plates are of metallic iron.

4. A process according to claim 1, wherein said water traverses said plate stack in 0.5 to 2 minutes.

5. A process according to claim 1, wherein supplied current density is 1.5 to 4 mA per square centimeter of electrode surface.

6. A process according to claim 1, wherein supplied voltage may be varied, a higher voltage being applied to water having a low conductivity and a lower voltage being applied to water having higher conductivity.

7. A process according to claim 1, wherein supplied current is AC.

8. A process according to claim 1, wherein supplied current is DC.

9. A process according to claim 8, wherein supplied current direction is reversed after extended operation so as to equalize erosion of the electrode plates and thus to extend electrode operating life.

10. A process according to claim 1, further including the addition to incoming impure water of fluids containing $Al^{+++}$ and $Fe^{+++}$ ions.

11. An apparatus for water and wastewater treatment by an electroflocculation process, comprising a) a processing vessel having a lower inlet for impure water, and an upper outlet for purified water;

b) a stack of electrically-conducting perforated spaced-apart plates serving as metallic electrodes, each of said plates beign provided with an array of a multiplicity of through-going apertures, said electrodes being selected from the group consisting of metallic aluminum electrodes and metallic iron electrodes, and said plates being suspended in said vessel with their peripheral edges in proximity to a wall of said vessel, each plate being electrically insulated from adjacent plates and having apertures misaligned relative to apertures of adjacent plates; and c) a first and a second electrically conducting member, said first member being electrically connected to the upper plate of said stack and to alternate lower plates and insulated from other plates, said second member being electrically connected to plates electrically unconnected to said first member and insulated from plates connected to said first member, said conducting members being provided with terminals outside said vessel for connection thereto of an electric power supply, supplying voltage in the range of between 2 and 60 volts for forming trivalent ions in situ by electrolysis of said metallic electrodes which trivalent ions function as coagulating agents within the vessel, wherein each plate is charged with a polarity opposite to plates adjacent thereto and apertures of adjacent plates are vertically misaligned, whereby turbulent flow and mixing is created by the sequential passage of said water to be treated, through the plates, from the apertures of the lowest of said plates to the apertures of the plates thereabove to exit from the highest of said plates.

12. The apparatus according to claim 11, wherein said perforations in said plates are formed by U-shaped cuts in said plates, the material inside said U being bent to extend outside the plane of the plate surface to form a deflector flap causing turbulence to water passing through said perforation formed by bending of said material.

13. The apparatus according to claim 12, further comprising an access opening for the removal of accumulated sludge from said processing vessel.

14. The apparatus according to claim 11, wherein the distance between said plates is between 0.5 and 1.5 cm.

15. The apparatus according to claim 11, wherein all of said plates are of metallic aluminum.

16. The apparatus according to claim 11, wherein all of said plates are of metallic iron.

17. The apparatus according to claim 11, further comprising means to vary the supplied voltage.

18. The apparatus according to claim 11, further comprising an electrically insulating elastomeric sealing member disposed between the peripheral edges of said plates and the wall of said processing vessel.

19. The apparatus according to claim 11, further comprising a mixing pump connected to said inlet for impure water for the controlled addition of fluids containing $Al^{+++}$ and $Fe^{+++}$ ions.

20. An apparatus for water and wastewater treatment by an electroflocculation process, comprising a) a processing vessel having a lower inlet for impure water, and an upper outlet for purified water;

b) a stack comprising a plurality of electrically-conducting perforated spaced-apart plates serving as metallic electrodes, said electrodes being selected from the group consisting of metallic aluminum electrodes and metallic iron electrodes, and said plates being suspended in said vessel with their peripheral edges in proximity to a wall of said vessel, each plate being electrically insulated from adjacent pates and having a plurality of spaced-apart apertures within a periphery of the plate, said plurality of plates being disposed with the respective plurality of apertures vertically misaligned relative to apertures of adjacent plates such that water passing from the lower inlet to the upper outlet of the processing vessel passes through the spaced-apart apertures within the peripheries of the respective plates to create a turbulent flow and mixing of the water; and c) a first and a second electrically conducting member, said first member being electrically connected to an upper plate of said stack and to alternate lower plates and insulated from other plates, said second member being electrically connected to plates electrically unconnected to said first member and insulated from plates connected to said first member, said first and second conducting members being provided with terminal means outside said vessel for connection of an electric power supply to supply supplying voltage for forming trivalent ions in situ by electrolysis of said metallic electrodes.

21. An apparatus according to claim 20, wherein each plate is a planar surface comprising apertures within all quadrants of the planar surface.

22. An apparatus according to claim 20, comprising blocking means for preventing passage of water between the peripheral edges of the plates and the wall of the vessel.

23. An electroflocculation process for water and wastewater treatment comprising (a) providing the apparatus of claim 20;

(b) supplying a voltage to said metallic electrodes in a range of between 2 to 60 volts to form trivalent ions in situ by electrolysis of said metallic electrodes; and (c) causing water to ascend sequentially from the lower inlet to the upper outlet through the spaced-apart apertures within the peripheries of the respective plates to create a turbulent flow and mixing of the ascending water.

* * * * *